US011717987B2

(12) United States Patent
Gamberini (10) Patent No.: US 11,717,987 B2
(45) Date of Patent: Aug. 8, 2023

(54) COMPACTOR

(71) Applicant: WEBSPHERE IT & SOFT SOLUTIONS SRL, Buchare (RO)

(72) Inventor: Maria Giovanna Gamberini, Ferrara (IT)

(73) Assignee: WEBSPHERE IT & SOFT SOLUTIONS SRL, Buchare (RO)

( * ) Notice: Subject to any disclaimer, the term of this patent is extended or adjusted under 35 U.S.C. 154(b) by 592 days.

(21) Appl. No.: 16/303,410

(22) PCT Filed: May 24, 2017

(86) PCT No.: PCT/IB2017/053061
§ 371 (c)(1),
(2) Date: Nov. 20, 2018

(87) PCT Pub. No.: WO2017/203445
PCT Pub. Date: Nov. 30, 2017

(65) Prior Publication Data
US 2021/0221028 A1 Jul. 22, 2021

(30) Foreign Application Priority Data
May 24, 2016 (IT) .................. 102016000052957

(51) Int. Cl.
*B29B 9/06* (2006.01)
*B30B 11/28* (2006.01)
(52) U.S. Cl.
CPC ............. *B29B 9/06* (2013.01); *B30B 11/28* (2013.01)

(58) Field of Classification Search
CPC ......... B30B 11/228; B30B 11/28; B29B 9/06; B01J 2/20
See application file for complete search history.

(56) References Cited
U.S. PATENT DOCUMENTS 2,063,404 A * 12/1936 Selman ................ B30B 11/201
425/331
3,391,657 A * 7/1968 Reese ................... B30B 11/202
425/461

(Continued)

FOREIGN PATENT DOCUMENTS

EP 275128 * 7/1988
WO WO 2010/060617 * 6/2010

*Primary Examiner* — Leith S Shafi
*Assistant Examiner* — Nicholas J Chidiac
(74) *Attorney, Agent, or Firm* — Leason Ellis LLP (57) ABSTRACT

Compactor (100) for the "granulation" of plastic materials, the compactor (100) comprising a first zone or unit (101) for loading and distribution capable of being loaded with plastic material and distributing the plastic material loaded to other zones and/or units of the compactor (100); a second zone or unit (104) comprising a perforated spinneret (110) and at least one compacting roller (105) installed external to the spinneret (110), where the material is "granulated" by "sinterization" deriving from its forced passage through the perforations of the spinneret (110) under the action of the at least one roller (105); a third zone or unit for the forced feeding of the material, being provided at the at least one roller (105) comprising at least one rotating feeder auger (111) housed at least partially in a tubular housing (113).

20 Claims, 7 Drawing Sheets

(56) References Cited

U.S. PATENT DOCUMENTS

| | | | |
|---|---|---|---|
| 3,592,129 A * | 7/1971 | List | B30B 11/12 100/157 |
| 3,723,042 A * | 3/1973 | Raydt | B30B 11/28 425/331 |
| 3,932,091 A * | 1/1976 | Vink | B30B 11/207 425/331 |
| 4,162,881 A * | 7/1979 | Morse | B30B 11/207 425/331 |
| 4,316,713 A * | 2/1982 | Trickett | B30B 11/202 425/331 |
| 4,817,517 A * | 4/1989 | Ammann | B30B 11/202 99/483 |
| 5,582,847 A * | 12/1996 | Peterson | B30B 11/005 425/144 |
| 5,928,678 A * | 7/1999 | Lund | A23K 40/25 425/207 |
| 6,299,430 B1 * | 10/2001 | Wallace | B01J 2/20 100/905 |
| 7,708,214 B2 * | 5/2010 | Medoff | B29C 45/0001 241/28 |
| 2012/0211914 A1 * | 8/2012 | Walker | B01J 2/20 264/109 |
| 2012/0289726 A1 * | 11/2012 | Josten | C11C 3/003 554/170 |
| 2013/0084349 A1 * | 4/2013 | Walker | B30B 11/202 425/331 |
| 2014/0138865 A1 * | 5/2014 | Blok | B29B 9/06 264/40.1 |
| 2015/0217527 A1 * | 8/2015 | Kalverkamp | B30B 11/28 425/337 |
| 2016/0001517 A1 * | 1/2016 | Paeper | B30B 11/201 425/335 |
| 2016/0050913 A1 * | 2/2016 | Shimanuki | A01N 43/08 264/143 |

* cited by examiner

COMPACTOR

RELATED APPLICATIONS

This application is a National Stage application of International application PCT/IB2017/053061 filed May 24, 2017 and claiming priority of Italian Application No. 10 2016 0000 52957 filed May 24, 2016, both applications are incorporated herein by reference thereto This invention concerns the production of granules of plastic material. In particular, this invention concerns the production of granules of plastic material suitable for use for the production of goods and/or objects such as, but not limited to, vase-type containers, pipes, productions for construction and goods and/or similar objects, in particular through a process of injection and/or extrusion. In detail, this invention concerns equipment and an improved method for the production of plastic granules of the above-mentioned type.

KNOWN STATE OF THE ART

The current methods of "granulation" of plastic materials make use of systems known in the sector with the name of "slit die extruders", which base their process on melting the materials and the subsequent creation of long filaments that are then cut to form tiny granules.

The method described above applies both to the production of granules from "virgin" plastic polymers deriving, that is, directly from the distillation of petroleum, and for the production of plastic granules from regenerated plastic (recycled after a previous use).

In particular, the uniform plastic waste, after it has been subjected to the classical operations of regrinding and washing, is "regranulated", in those cases in which the "regranulate" is sold and used in processes of molding and/or injection and/or extrusion, as the "regranulate" has the same physical and mechanical characteristics as "virgin granulate" and is therefore entirely compatible with the parameters of "apparent specific weight" and "penetration" with which the traditional machines for molding or extrusion were built.

The machinery and/or equipment according to the known technique and most commonly used at the present time for the processes briefly described above are known in the sector with the definition of "slit die extruders" immersed in water and consisting basically of a steel machine with a cylindrical main body containing heating elements used to generate a significant quantity of heat with the inevitable consequence of consuming large quantities of energy. In particular, the methodology according to the known state of the art provides that the plastic material, uniform or blended into a compound, is fed into one end of said cylindrical body and conveyed forward, and homogenized by means of one or two "auger" type screws. While the material is conveyed forward, the heating elements bring the temperature of the material high enough to soften and melt it.

At the opposite end of the conveyor apron, the plastic material exits through a special cooling spinneret that makes it possible to obtain long slender strings in the shape of so-called spaghetti; the use, at last, of the so-called "slit die" makes it possible to obtain the "granule" in its final configuration measuring a few millimeters.

Also according to the methodologies of the known technique, the cooling step is generally achieved by immersing the product in a flow of cold water which, then has to be eliminated in a final process of spinning the product in a centrifuge, then drying it.

In the last step, the "granule" is packed in "big bags" for shipment and sale.

When it reaches the user/manufacturer of the finished goods, such as pallets, vats, tubs, pipes, construction products in general, noise-absorbing walls for highways and railroads, road modules, pallets for the shipment of goods and similar elements, the "granular material" is subjected to another process of transformation in which it is melted, then molted or extruded, and again subjected to cooling, with a further consumption of energy to heat it, and then cool and/or dry it.

This means that, according to the methodology of the known state of the art, the plastic materials undergoes two complete processes of melting and cooling, with the need to achieve increases of temperature on the order of 200° C. to heat the material, and decreases of temperature of the same amount to cool it.

The energy in play will therefore total about 440 Kcal for every kilogram of material treated, to be used in the production process, to which it is then necessary to add the energy of the centrifuge process and drying, necessary to eliminate the cooling water at the end.

For the reasons described above, it can easily be seen that the processes according to the known art of "granulation" by melting are burdened by many problems and/or difficulties which the applicant intends to remedy with this invention; these problems and/or difficulties can, in particular (but without limitation) be summarized as follows.

A first problem and/or difficulty derives from the need to use technologically complex systems, as described above, which are very expensive, in order to obtain worthwhile production levels.

A second problem concerns energy consumption, which is decidedly too high to obtain a "granule" that will have to be melted down again in order to be transformed into a finished product.

There is also a problem concerning the limitation of the usable material, which must necessarily be uniform and clean, without the presence of other inert material that, in the absence of adequate filtration, could clog the system devoted to performance of the process, which would then have to undergo maintenance in order to be restored to operation.

Moreover, an additional and not insignificant difficulty concerns the inevitable reduction—approximately as much as 10% of the total quantity of "granulate" products, by effect of the trapping action of the continuous or discontinuous filters which, as they are also very costly both in terms of purchase price and of the costs of use and maintenance.

Additionally, it is worth pointing out to the inevitable limitation in the creation of suitable and new compounds of different materials, the severe limitations of production and the costs of management and investment, for the same overall amount of production amounting to at least three times as much as those that would result from application of this invention.

Among other considerations, there is also the fact that the methodologies according to the known state of the art, with violent cooling of the polymer mass, increase the percentage of crystalline agglomeration (spherulites), which can only be detected by X-ray and which can even reach very high levels of as much as 75%-80%, where these granules are responsible for the mechanical performance of the products as well as its specific weight.

Concerning these bodies, they are crystalline polymers that are semi-crystalline and amorphous, and therefore polymers with many inclusions of crystallites which give them more or less accentuated actions of resistance to rapid and prolonged traction, resistance to deformation (bending) which may be more or less prolonged, tenacity (resilience), resistance to sudden impact, falling of weights on the structure.

These grains of crystals (spherulites) can achieve dimensions of even several millimeters, where their presence accentuates the fragility of the structures, particularly those having very limited thickness of 2/4 mm. These grains generally have a low melting point, between 90° C. and 120° C., which is commonly called the temperature of vitreous transition. Below this temperature, we have a semi-crystalline crystal structure and above it we have a semi-crystalline or amorphous structure.

In addition, polymers present one important feature according to their nature: if drawn at intermediate temperatures, those of transition, they improve their mechanical tractions and bending characteristics and, consequently, also their modules (ratio between deformation and load).

The main purpose of this invention is therefore to overcome or at least minimize the difficulties described previously and observed in the equipment and methodologies according to the known art for the production of plastic granulate. Particularly, one of the aims of this invention is to make available an apparatus and a method for the production of plastic granulate with the following characteristics: increased yield in production, by homogenizing uniform or heterogeneous polymer masses and then melting any crystalline bodies (spherulites), making it possible to produce plastic granulate with improved mechanical resistance to traction and in particular to bending, and improvement of the respective modules, so that, in particular by effect of applying pressure (see the following description) it is possible to obtain the surface welding of the polymer particles, determining at the same time a process of sinterization (temperature and pressure) that ensures the continuity and uniformity of the process of extrusion of granules of 2/5 mm and pellets of 10/15 mm, without appreciable gaseous formations. The resulting granulates/pellets will be superficially brilliant, uniform throughout the processed mass, with excellent mechanical characteristics and, in particular, impact resistance, such that the end products would therefore be capable of deforming under a load and returning to their original shape (on removing the load) and thus able to deform with a broad elastic interval.

Further scopes of this invention include:

The production of pellets/granulate at considerably lower costs than those generated by the existing systems of granulating and regranulation by melting, with slit die extrusion and immersion in water;

The treatment of virgin materials, uniform selected plastic waste, blends of heterogeneous mixed plastic regrinds, also with the inclusion of inert materials, without filtration and washing;

The improvement of the uniformity of the polymers, in particular by treating them at a temperature between 100° C. and 120° C.;

The improvement of the mechanical performance such as traction, bending and resilience as well as for the melting of crystals, also by cutting, determined by the pressure of the rollers on the regrind (see the description hereafter); The production of plastic granulate free of volatile substances (that with the methodologies according to the known art are generated because of the temperatures in play), which decrease the mechanical performances of mechanical resistance to load, but above all to sudden impacts.

DESCRIPTION OF THIS INVENTION

In view of the problems encountered in the methodologies according to the known art, and of the aim which this invention proposes to achieve, the subject of this invention is an apparatus for the production of plastic granulate according to the main claim 1. Other embodiments of the apparatus according to this invention are defined by means of the dependent claims.

Moreover, according to one embodiment, the equipment can provide control of the hourly capacity of the regrind to be processed, the temperature of the spinneret (110° C.-120° C.), the temperature of the presser rollers (25° C.-30° C.), the rotation speed of the spinneret (rpm).

According to one embodiment, the apparatus according to this invention (hereafter defined as a "compactor" for the sake of brevity) includes control units for thermostats controlled by infrared radiation sensors, which maintain a constant temperature setting.

According to one embodiment, the compactor according to this invention is a complex system of machinery consisting essentially of a zone or unit of collection and distribution of the incoming uniform or heterogeneous regrind plastic material; another zone or unit in which said material is "granulated" by compacting it through compacting rollers, external to a perforated rotating spinneret and, finally, by another zone of collection of the processed granulate.

According to one embodiment, the first zone or unit is equipped with an infeed system of several augers that convey the material from the collection section on the infeed to a point beneath the presser rollers.

According to one embodiment, the second zone or unit makes use of a system of "granulation" that is heat-controlled, consisting of presser rollers external to a rotating perforated spinneret, positioned radially with respect to the center of the axis of rotation, and which therefore exercises an action that is exclusively concentric in its entirety.

According to one embodiment, the third zone or unit consists of a processed granule collection unit with a system for bagging and possible recycling of the scrap portion of the material.

According to one embodiment, the COMPACTOR according to this invention makes it possible to obtain a final "granule" with a "cold" process, that is without using energy to heat the masses, but only mechanical energy to turn the rollers pressing on the plastic material, applied to the outside of a perforated ring, called a "spinneret", inside the perforations of said ring; the gliding friction generated between particle and particle of the plastic material during the above-described process, and the plastic deformation effect itself generate heat, which can even be very high, and which, properly regulated, makes it possible to achieve the necessary phenomenon of "granulation".

According to one embodiment of this invention, heat compacting includes control of two fundamental parameters which are the pressure on the uniform or composite material to be granulated and the temperature generated by the aforementioned compacting pressure (to be held preferably at about 80° C.-115° C. degrees for the spinneret and 25/30° C. for the rollers).

According to one embodiment, the combined control of these parameters determines a sort of surface sinterization of the particles which makes it possible to obtain compact, uniform "granulates", with excellent surface aspect also on the cut surfaces.

In fact, the material pressed into the perforations of the "spinneret", from the outside toward the inside of the element, undergoes a cutting action by means of a special adjustable fixed blade, also inside the ring, which can thus create "granules" of any size desired.

According to one embodiment, maintenance of the temperature of 110/115° C. for the spinneret and 25/30° C. for the rollers is achieved by means of an innovative system of thermostating and/or heat regulation of the compactor; moreover, according to one embodiment, suitable temperature measuring devices installed along the mechanical parts involved in processing the product serve to send the relative data to a computerized control unit and, consequently, to allow the control unit to enable a "conditioning" system— "Chiller" to circulate appropriate cooling/heating fluid in a network of heat regulation of the temperature of the compacting rollers and "spinneret" ring.

The temperature of 110/115° C. for the spinneret and 25/30° C. for the rollers can thus be maintained within a gradient of + or –5 degrees.

According to one embodiment, no significant cooling action is required, as is the case with the traditional granulation process in which it is necessary to lower the temperature by about 150° C. It is only necessary to reduce the temperature of the product by about 10/15° C., and only in the summer.

According to one embodiment, the feeder system supplies each presser roller in a dotted pattern through individual independent augers equipped with motors running at variable rpm so that each compacting wedge has adequate and constant feeding over the entire pressing face of the roller.

According to one embodiment, to permit the optimum influx of regrind on all the presser roller in the sections above and below the horizontal axis, pulsed air blowers are applied along the axis of the augers. This ensures a uniformity of supply to each roller for every angular position.

According to one embodiment, to reduce the scattering of regrind in the form of unprocessed scraps, each roller is installed inside a casing, subject to the action of a blower that is always under pressure by air, which prevents pooling and recycles any scraps that form during the process.

According to one embodiment, to maintain a constant temperature (110° C.-120° C.) in the spinneret and on the presser rollers, (25° C.-30° C.), two separate and independent thermostats are used, controlled by special infrared sensors that control the intensity of heating depending on the needs of the process. The heat exchange fluids are diathermic oil for the spinneret and water and glycol for the rollers.

According to one embodiment, to ensure adequate adjustment of the air-gap between rollers and spinneret (0.1-0.2 mm) at the heat conditions specified, a screw control with a pitch of 2 mm is provided. It connects all the rollers with special joints for micrometric approach of the rollers to the surface of the spinneret. For independent adjustments, each joint (intermediate coupler) consists of two sockets with opposite threading that serve to adjust each roller separately.

According to one embodiment, to reduce to a minimum the momentum of mass inertia of the rotating parts, a constant torque brushless motor is used even at low rpm from 209 kW of max power to 200 rpm with cos $\phi$=1 at high yield, with constant cooling to (20° C.-25° C.) by a chiller. In this way, any overloads (torque) beyond the limit set will cause immediately disconnection and braking without impact or danger of breakage on encountering foreign bodies in the compacting wedges. By effect of the maximum torque even at low (minimum 5%), the motor is splined directly on the spindle holding shaft and thus on the spinneret.

According to one embodiment, the assembly of spinneret and rollers, with adjustment of the radial feeder augers of $\phi i=85$, protected and enclosed by a hatch, is opened or closed by a set of actuators that allow access to the inside. This is only possible manually, and only on condition that the auger and motor of the spinneret are absolutely inactive, according to an arrest procedure also for the auxiliary components.

According to one embodiment, double fairing is provided at the rear to protect the load bearing structure, the motor, the thermostating control unit, the roller adjustment system, and the compacting equipment (spinneret and 6 rollers). The fairing is lined on the inside with insulating pads to reduce the noise to the levels permitted by law.

According to one embodiment, a belt installed in the upper part of the machine, with variable speed, supplies the regrind for processing. The section conveyed by the belt feeds into a hopper that divides the capacity among the radial feeder augers so that its stoppage or slowing determines the interruption or variation of the capacity/m'. A filtration screen prevents the input of large pieces, and a metal detector with a bar across the feeder conveyor belt signals the presence of inadmissible metallic elements that can be eliminated by a multiple (spoiler), driven pneumatically, which ejects them into a separate container. According to one embodiment, a blade with radial position, controlled manually by a screw, determines the length of the granule/pellet expelled by the spinneret after cutting/breaking, which is packed after a stage of cooling and dedusting (2/5 mm granule, 10/15 mm pellet). The processed regrinds emerge at a temperature of about ~90° C., and must be cooled to about 70° C., the dedusting scraps are reprocessed.

BRIEF DESCRIPTION OF THE FIGURES

Hereafter, this invention will be illustrated by the description of some of its embodiments shown in the attached drawings. It should be noted, however, that this invention is not limited to the embodiments shown in the drawings; conversely, all the variations or different embodiments illustrated and described hereafter that appear clear, obvious and immediate to the expert in the field come within the scope of this invention. In particular, in the drawings attached hereto.

The figures from 1 to 3 each show a perspective view of the compactor in its entirety according to one embodiment of this invention.

DETAILED DESCRIPTION OF THIS INVENTION

This invention has particular and effective application to the production of granulates of plastic material intended for the production of manufactured goods and/or objects such as vats, tubs, pipes, construction elements, noise-abatement walls for highways and railroads, road modules and the like. The uses of the granulate produced by means of the apparatus and/or the method detailed according to this invention includes, however, also the production of goods not explicitly mentioned and/or indicated in this description.

Figure 1:
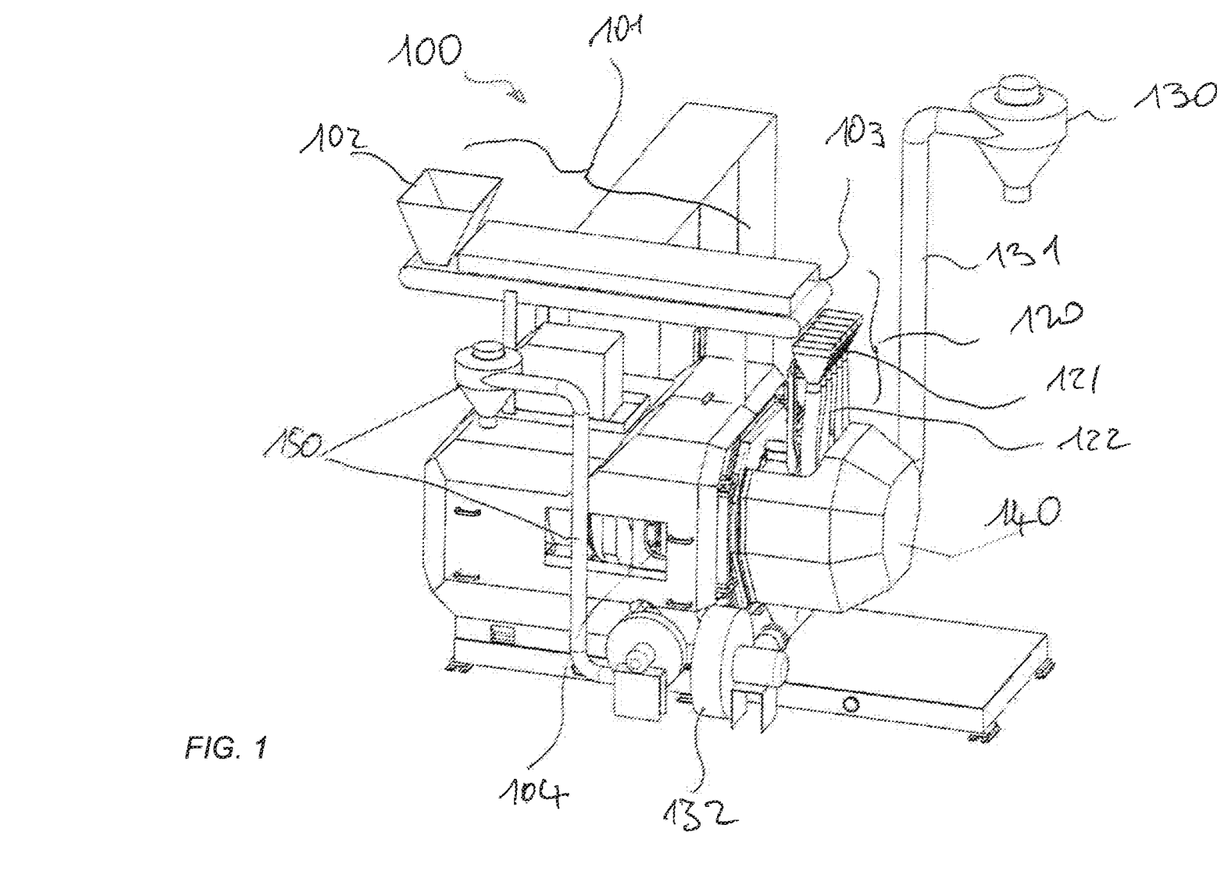
Figure 2:
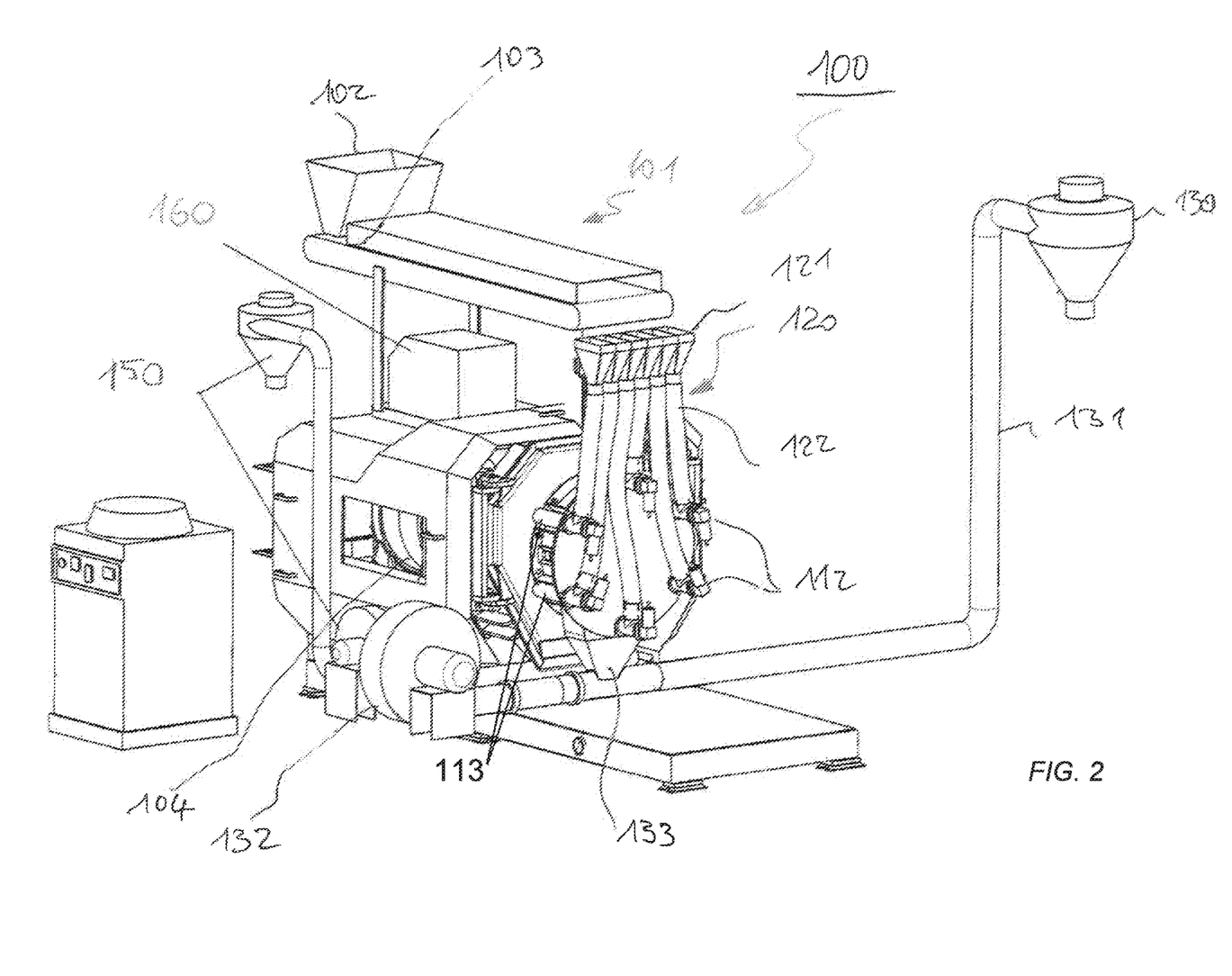
Figure 3:
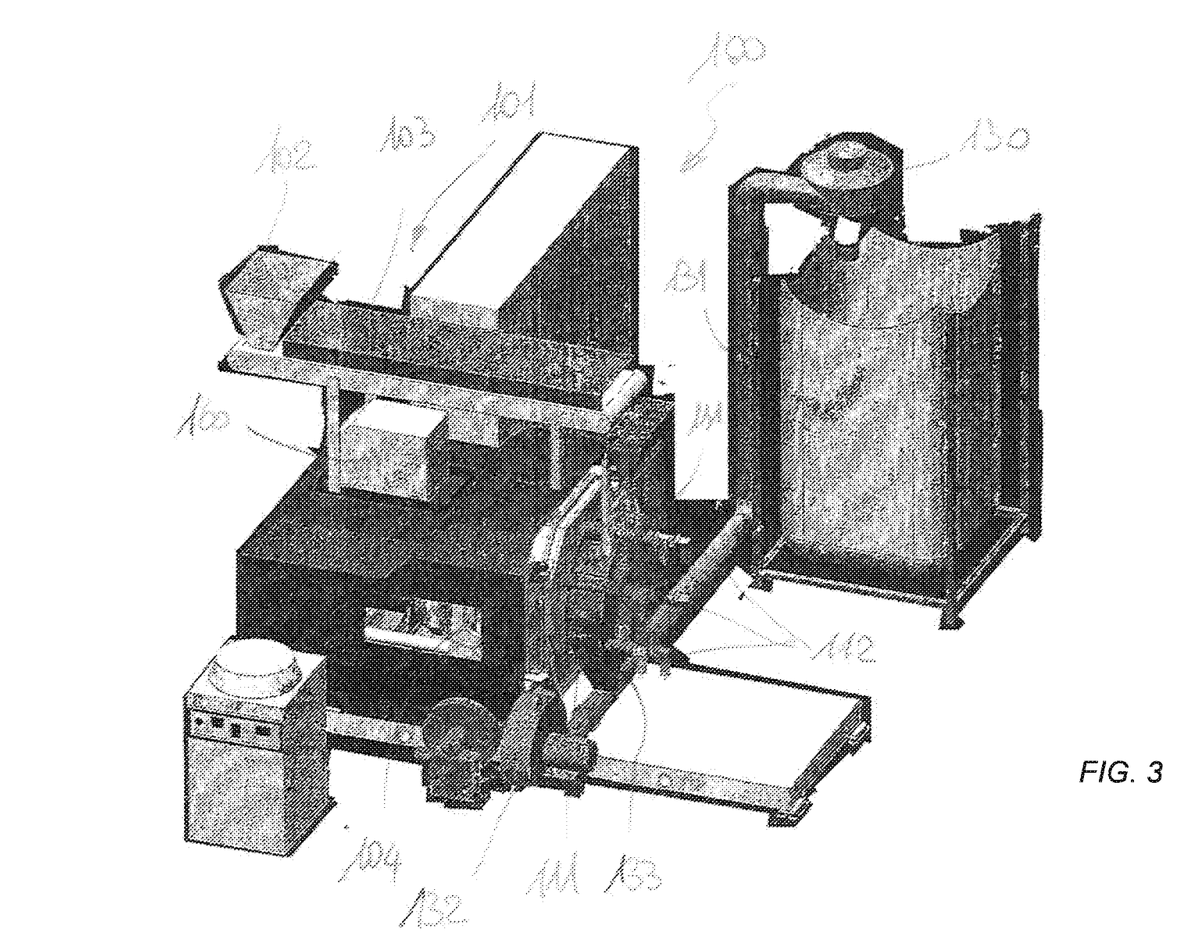
Figure 4:
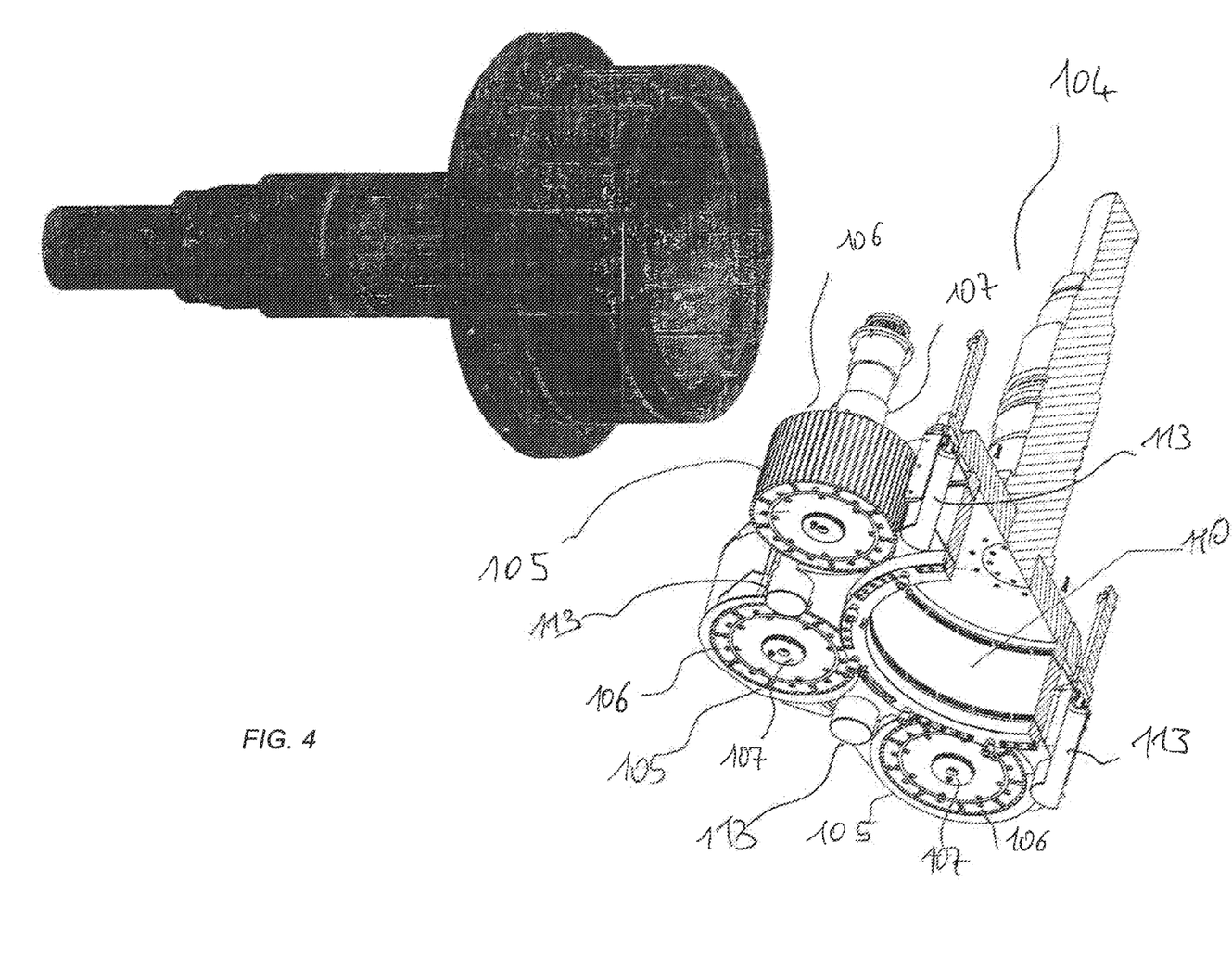
FIG. 4 shows perspective views and a partial cross-section view of parts of the compactor according to one embodiment of this invention.

With reference to the figures from 1 to 3, the compactor 100, according to one embodiment of this invention, includes a zone or loading unit 101, another zone of collection/sorting 120, a zone or unit of actual granulation 104, a unit or zone of input and, finally, a unit or zone of discharge and recovery. In practice, the plastic material to be granulated, which can either be "virgin" plastic material or material deriving from recovery and/or recycling, is loaded in the hopper 102 and the plastic material leaving the hopper 102 is conveyed on a belt 103 to the next zone or station or unit 120 for collection/sorting. Subsequently, the material unloaded by the belt 103 of the sorting hopper 121, is conveyed by falling from each of the sorting hoppers 121 to the next zone or station or unit through the corresponding pipe 122. The next station is, in particular, a supplier station consisting of a plurality of rotating augers 111, numbering six in the non-limiting example shown in the figures, where each auger is housed in the corresponding tubular housing 113 and where each tubular housing 113 is connected to a corresponding conduit 122 by means of a T-shaped coupling. The station or unit described here is given the name, for the sake of clarity of description, of feeder station or unit, as by means of the rotating augers 111, the material to be processed is sent to a subsequent station 104 for the actual granulation process, performed in the manner that will be clarified in detail hereafter. Finally, by means of a station or unit of collection and/or recovery, the granulate leaving the granulation station or unit 104 is recovered and conveyed into containers for shipment such as, for example, "big bag" type containers, also in this case according to methods that will be clarified more in detail hereafter. In particular, for this purpose, parts and/or characteristics of the different stations and/or units of the apparatus 100 according to this invention will be described in detail, with reference to the figures, where said parts and/or characteristics of this invention already described previously with reference to the figures from 1 to 2, and described hereafter with reference to other figures, will be identified by means of the same reference numbers.

Figure 5:
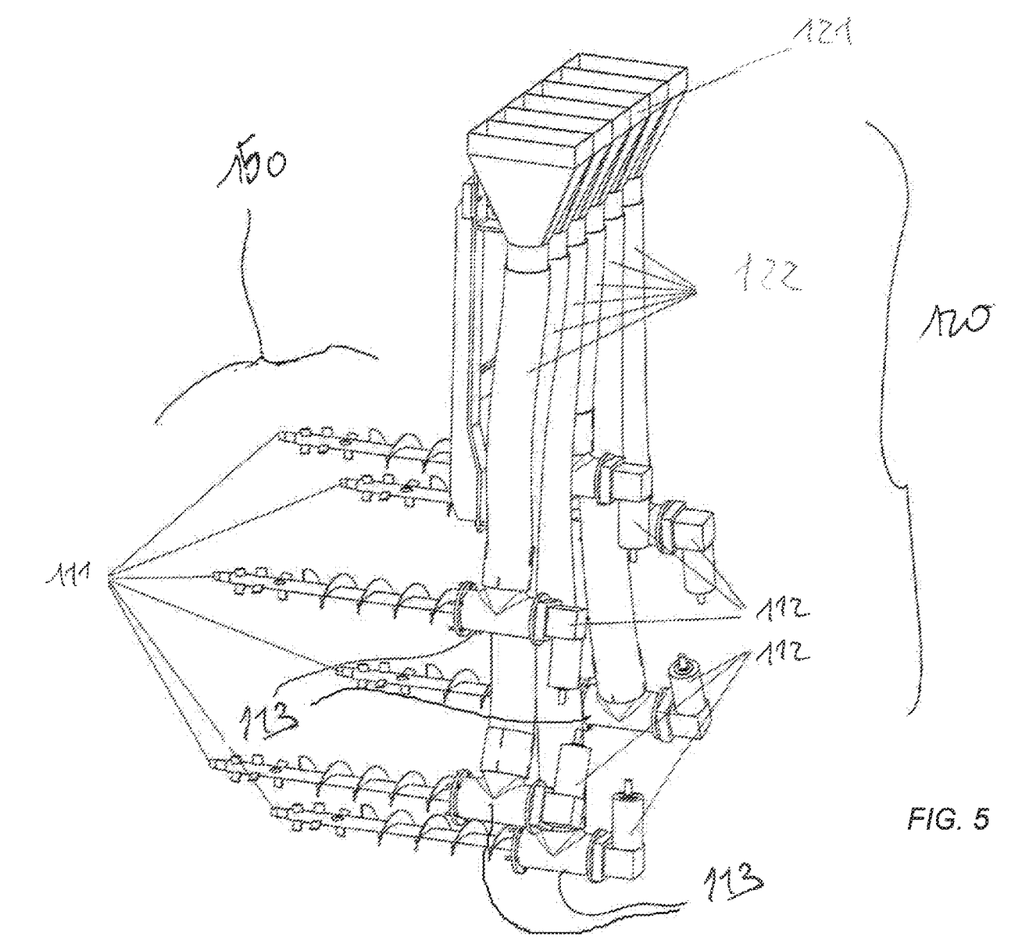
FIG. 5 shows a perspective view of parts of the compactor according to one embodiment of this invention.

FIGS. 2 and 5 (where in FIG. 2 the access and/or inspection hatch 140 of FIG. 1 is not shown, for the sake of clarity), show that each auger 111 is made to rotate by means of a gearmotor 112. The material being fed into the corresponding tubular housings 113 (through the couplings 123 and by falling along the conduits 122) is conveyed toward the inside of said tubular housings 113 (from right to left with respect to FIGS. 1, 2 and 5) by the rotation of the augers 111. Subsequently, said material leaving each tubular housing 113 is propelled outward by a perforated spinneret 110, in particular onto a grooved roller 105. In practice then, the augers 111 and respective tubular housings 113 are arranged outside the spinneret 110, in particular distributed radially along the external circumference of the spinneret 110, at substantially regular radial intervals depending on the number of augers (60° in the case of six augers as shown in the example illustrated). Each auger 111 is provided with a roller 105, which is likewise distributed radially along the outer circumference of the spinneret 110 at regular radial intervals.

Figure 6:
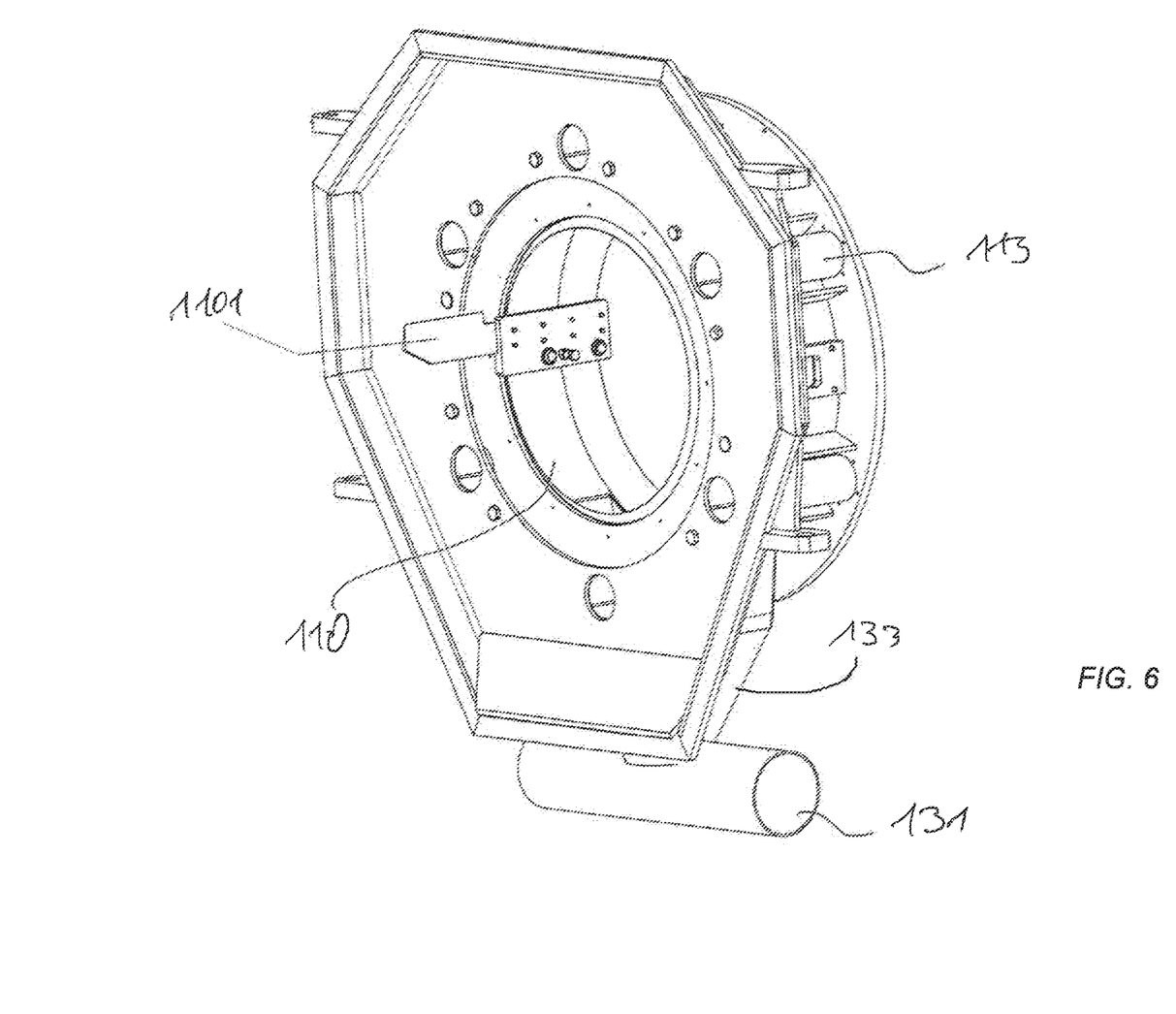
FIG. 6 shows a perspective view of parts of the compactor according to one embodiment of this invention.

The spinneret 110 includes in particular a hollow cylindrical portion with a plurality of perforations (not shown, for reasons of clarity) that place the internal space, bordered by the hollow cylindrical portion, in communication with the external space; the spinneret 110 also rotates and, for granulation of the plastic material, it is made to rotate by means of a motor, for example but not necessarily a brushless or similar motor, suitable for the purpose. With the plastic material coming out of the housings 113 onto the rollers 105, the rollers 105 are made to rotate by the spinneret 110, where the plastic material to be granulated is trapped between each roller 105 and the spinneret 110 and then pressed/extruded through the perforations in the spinneret 110, and definitively granulated, where the granulated plastic material falls into the spinneret 110. To this end, it is appropriate to specify that, as shown in detail in FIG. 6, a cutting blade 1101 is fastened on the inner surface of the spinneret cylinder (with respect to the spinneret 110), where the material emerging from the perforations, with the spinneret 110 in rotation, is divided into granules.

Moreover, to facilitate the granulation, each perforation in the spinneret 110 includes a conical entrance which tends to narrow from the external cylindrical surface of the spinneret 110 toward the inside, to which a cylindrical portion ending on the inside of the spinneret 110 is connected, in particular through the internal cylindrical surface of the spinneret 110.

Figure 7:
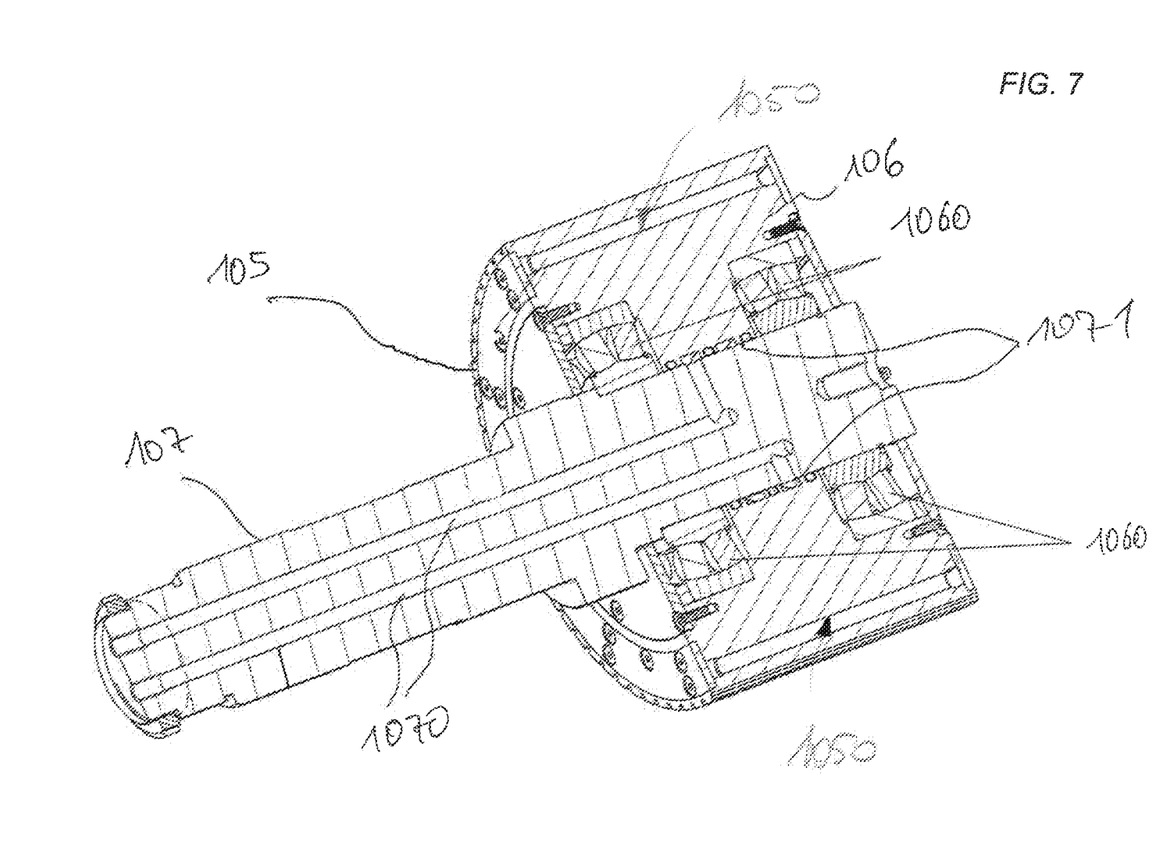
FIG. 7 shows a perspective view and a partial cross-section view of parts of the compactor according to one embodiment of this invention.

Moreover, as anticipated, the apparatus according to this invention is designed to permit granulation of the plastic material at a temperature that is controlled and significantly lower than the melting temperature of the plastic material, to which, on the contrary, the plastic material is heated in the processed according to the known art, in particular by heating it using electrical heating elements or similar heat sources. For this purpose, the apparatus 100 includes a cooling circuit using a cooling fluid, and rollers 105, of which only the main parts are shown in the drawings for reasons of clarity. With particular reference to FIG. 7, each roller 105 presents cooling conduits 1050 in communication with the main cooling circuit and including a hollow cylindrical portion 106 fitted so that it can revolve on a fixed rotation support or shaft 107, where the outer surface of the hollow cylindrical part 106 includes the longitudinal grooves described previously and where, therefore, it is the hollow cylindrical part 106 that is made to rotate by the rotation of the spinneret 110. The fixed support 107 includes two internal conduits 1070 in communication with the main cooling cycle and shaped so that by one of the two conduits 1070 (for supply), the cooling fluid (which may be water or oil) is conveyed into the cavity 1071 between the outer surface of the fixed support 107 and the inner surface of the rotating part 106, while by means of the second conduit 1070, the cooling fluid is collected from the cavity 1071 and returned to the main circuit to be, for example, cooled by means of a cooling device 160 incorporated in the compactor. In FIG. 7, the reference numbers 1060 identify the devices such as bearings or the like, provided to facilitate rotation of the part 106 on the shaft 107, thus reducing the friction and thereby limiting heating of the rotating part 106.

Another system of cooling and heating, not shown in the figures, can be provided for cooling and/or heating, for example by means of a viscous fluid such as oil or the like, of the spinneret 110. Said supplementary circuit, if provided, would limit the heating of the spinneret due to the temperatures generated by the pressure between the rollers and the spinneret, and acting on the plastic material, especially with the granulation procedure already in progress. On the contrary, at the beginning of a granulation cycle, when the spinneret 110 is still at room temperature, it is necessary to warm the spinneret by means of a warm or hot viscous fluid to give the plastic sufficient ductility to be pressed through the perforations in the spinneret 110.

Having thus described, with reference to the figures, the most peculiar parts of the apparatus according to this invention, the methods of granulation by means of said apparatus 100 can be summarized as follows.

As anticipated, the "raw" plastic material or, in any case, the material to be granulated, is loaded into the hopper 102 and then distributed by means of the conveyor belt 103 into the sorting hoppers 121, from which the plastic material emerges (essentially by falling) and, through the conduits 122, is fed into the tubular housing 113 of the augers 111. With the augers 111 in rotation, the material is discharged between the rotating spinneret 110 and the rollers 105 (made to rotate by the spinneret 110) and by these pressed through the perforations of the spinneret and then cut by the blade 1101. The granules then fall into a collection hopper 133 from which they are sent into a collection container along a conduit or pipeline 131, means of ventilation 132 being provided for the purpose of moving the granulate along the pipeline 131 by blowing. The reference number 130 in FIGS. 1 and 2 identifies another separator fan positioned at the end of the pipeline 121 for filling the containers.

Finally, it should be noted that, as shown, the apparatus 100 achieve by means of this invention can be equipped with a system of recovery 150, by which the processing scraps, in particular any plastic material not perfectly granulated, are recovered and separated or possibly returned into the granulation circuit to reblend it.

It has been shown by means of the preceding detailed description of the embodiments of this invention shown in the drawings that this invention makes it possible to achieve the desired aims and/or exceed or at least minimize the difficulties typical of the solutions according to the known art.

In particular, this invention permits management not only at much lower cost but also much more simply, and with many more possibilities of use of different materials.

This invention is suitable to the base element of a complete system of preparation not only of "uniform granulates" but also of composites appropriately treated with additives, blended, dried and freed of any inert substances. Using the same amount of energy, the compactor according to this invention guarantees production from 3 to 5 times greater than would be possible with a traditional granulator.

In order to provide a better and more detailed description of the above advantages in a concrete industrial application, a comparison is provided hereafter between the costs of production of "granules" of uniform or heterogeneous plastic material in a traditional installation with output of 2000 kg/h and the production of the compactor with which this invention is concerned.

The common reference parameters are:
1—Production of 2000 kg/h
2—External dimensions of granule in cross-section=4.5 mm.
3—Length of granule=2.5-4.0 mm.
4—Hours worked in one year=5,750
5—The incoming material may be either uniform or heterogeneous plastic reground to pieces of approx. 10/15 mm.
A—Traditional. System which Granulates by Melting Composed of the Following Elements:
Feeder hopper
Dual screw extruder for melting of the plastic masses powered by a motor at no less than 500 kW/h (or even 600 kW/h) and by a system for heating the masses with consumption of 200 kW/h
Stringer spinneret
Immersion slit die powered at 5 kW/h
Pipelines for collection of water and product
Centrifuge for separation of water and granule powered at 25 kW/h
Plate cooling with cooling water powered at no less than 160 kW/h to cool the granules to a temperature of around 80° C. for packing
Drum dryer to remove moisture from the product to be packaged, powered at about 20 kW/h
Device to send the dry granulate for packing, powered at 4.5 kW/h The total power installed will therefore be about 950 kW/h The fixed cost of the entire system will be 1,260,000 €.

The cost of management of the installation, inclusive of depreciation, electrical energy, personnel, maintenance and general overhead will be about 300 €/h., which will mean a cost of production of the granulate of about 150 €/t.
B—Compactor According to this Invention The power required for production of 2000 kg/h of granulate is:
Motor power of 210 kW/h
Auxiliary gearmotors for 3 kW/h
Three thermostating control units for 17.5 kW/h
A granule extractor powered at 4.5 kW/h
A scrap extractor powered at 2.25 kW/h
Hatch opener powered at 0.75 kW/h The total power installed will therefore be about 230 kW/h. The fixed cost of the entire system will be 600,000 €.

The cost of management of the installation, inclusive of depreciation, electrical energy, personnel, maintenance and general overhead will be about 160 €/h., which will mean a cost of production of the granulate of about 80 €/t.

It is therefore obvious that the savings guaranteed by the industrial application of this invention amount to around 50% with a fixed costs of the same percentage value.

Further indications with regard to energy savings-(compared with a granulation line according to the known art) are detailed hereafter.

The production considered here—2000 kg/h, is that achieved by the compactor that is the subject of this invention.

Power supplies necessary for a traditional slit die granulator:

| | |
|---|---|
| Primary extruder motor | 600 kW |
| Reduction gear lubrication control unit | 1.5 kW |
| Heating of cylinder Φe 320 – 440 | 120 kW |
| Vacuum pump | 5.5 kW |
| Filter (control unit) + heating | 25 kW |
| Slit die heating | 12 kW |
| Slit die gearmotor | 3 kW |
| Cooling water circulation (pump) | 4.5 kW |
| Centrifuge for separation or granules from cooling water | 15 kW |
| Chiller for circulating water | 25 kW |
| Drying of granulate after cooling ~2000 kg/h with drum-thermal fluid generation bed | 7.5 kW 25 kW |
| Launcher for packing | 4.5 kW |
| Total | 848.5 kW |

Power required by our 102-TC 2000/6 compactor for the same capacity:

| | |
|---|---|
| Primary motor power | 210 kW |
| Launcher of product to chiller deduster | 3 kW |
| Scrap extractor + augers | 4 kW |

-continued

| 2 cooling control units (pumps) | 1 kW |
|---|---|
| Spinneret heat control unit (only on startup) | 1 hour |
| Chiller for cooling water in closed circuit | 8 kW |
| Cooling by 20° C. of (granulate/pelets) 2000 kg with air and vibrators | 4 kW |
| Conveyor belt mocoms | 0.75 kW |
| Motor, for 6 augers | 2.2 kW |
| Total | (total) 243 kW |

R=835 kW/243 kW=3.45 times less

The product (pellet/granulate) is packed at about 70° C. Producing ~44 Ton every day at about 70° C., a heat reserve will be generated for: Q=44,000 kg×0.50 kcal/kg×50° C. (thermal excursion)=1,100,000 kcal/day. In addition, cooling the granulate/pellets with air from 90° C. to 70° C., a total heat reserve will be generated and can be used to heat the premises in the winter or to supply the dryers.

In the case of this invention, the passive thermal energy, about 10%, produced by friction inside the regrind, is used to maintain the necessary temperature at the spinneret and for the process of pelletization/granulation.

Moreover, applying this invention:
permits the easy flow in depression feeders to load the hoppers of the injection presses;
permits easy supply from the hopper to the homogenization screws of the press;
guarantees negligible gaseous contaminations from melting;
guarantees uniformity of the mass and maximum resistance to traction and bending, but above all, considerable resistance to impact and sudden deformation under the effect of the load;
guarantees lower costs of transformation than traditional systems for the same hourly output;
makes it possible to give the granulate acceptable surface aspects and roughness, in line with the traditional compounds of virgin products or those made from uniform selection of mono-materials or blends of polymers;

Also, with this invention it is possible to:
produce pellets/granulate at considerably lower costs than those generated by the existing systems of granulating and regranulation by melting, with slit die extrusion and immersion in water;
treat virgin materials, uniform selected plastic waste, blends of heterogeneous mixed plastic regrinds, also with inclusion of inert materials, without filtration and washing;
improve the uniformity of polymers by treating them at a temperature of 100° C.-120° C.;
improve the mechanical performance such as traction, bending and resilience as well as for the melting of crystals, also by cutting, determined by the pressure of the rollers on the regrind;
eliminate any presence of volatile substances, prevent deterioration of inert substances, given the low process temperature, and prevent the gaseous formations of every kind, which would negatively affect performances of mechanical resistance to loads, but above all to sudden impacts, which are constantly caused during shipment and handling;

Moreover, according to this invention, when the produce is up and running regularly, the internal surface glide friction and cutting actions caused by the shape of the perforation and its mouth, generate thermal energy in sufficient quantities to keep the process active. Under these conditions the spinneret maintains the proper temperature almost independently, while the rollers are kept cool at the temperature mentioned of 25° C.-30° C.

Although this invention has been clarified by means of the detailed description of its embodiments shown in the drawings, it is possible to make alterations in the compactor 100 described above and illustrated in the drawings without leaving the sphere of protection of this invention. On the contrary, all those variations of the embodiments described and represented that appear obvious and immediate to an expert in the field fall within the scope of this invention.

Examples of possible variations of the embodiments described previously with reference to the drawings are described hereafter.

According to a first variation, the perforated band used by the spinneret can be enlarged by 32%, and consequently also the rollers to 248 mm rather than 188 mm, with 9583 perforations instead of 7260. This increases production capacity to an extent greater than the increased power applied.

According to another variation, the two thermostating control units are eliminated, that for solely cooling the motor and rollers, which will be cooled by the chiller only, directly through 2 thermostatic valves that control and maintain the temperature setting. The only control unit kept is that of the spinneret for heating/cooling, coupled to the chiller for air cooling (powered at 16 kW) installed on the back of the load-bearing frame. This makes it possible to lower the machine by 500 mm and lengthen it by 700/800 mm for a more elongated aspect.

According to another variation, the front hatch 140 closuring the compacting unit is produced complete with external casing, supply nozzles, casings for the containment of the scraps, infeed augers, centering devices for the support of both the spinneret and the rollers, so as to give structural solidity to the assembly, eliminate the consequent strong vibrations, transfer greater compacting capacity and the relative consequent bending forces.

According to one variation, the hatch 140 is centered and blocked against the structure of the load-bearing base by means of 6 centering means with rapid fastening. The hatch thus forms a single solid structure of double support, with only axial aperture L=1200 mm, by means of a double guide area H=2300 mm from the ground, such that the operators can work comfortably standing up, without any hindrance. A single actuator serves for both opening and closure. When the hatch is open in this version, it entirely uncovers the 6 rollers and spinneret, making them easily accessible and permitting easy removal of any scraps that may have escaped the process, facilitating the easy disassembly of the spinneret and rollers using appropriate tools, and of the load-bearing chuck using the same guides. This also permits reduction of the frame to the end of the fixed support, so that the operator can clean and dismantle it, working on the ground, more conveniently and easily.

According to a constructive variation, the variation of the "air-gap" (distance between the surface of the roller and that of the spinneret) is regulated by a gearmotor operated by a key. The space is displayed by a digital instrument, as a red band proportional to the distance and graduated in tenths of a millimeter. Every turn of the control moves it closer or farther away by 0.01 mm; when it reaches 0, the control goes into a block for safety. The adjustment can be made during production without stopping the spinneret. The position of the roller with respect to the spinneret is recognized by a laser referred at the moment only to roller no. 1, since the others are linked to the adjustment control. The motor that controls the chuck is still splined directly, without interposition of reduction gears, pulleys, belts (at least 20). It is stopped by braking when it exceeds the max torque at any production rate, with greatly improved flexibility, associated with a stoppage sequence of the machine.

The scope of this invention is thus defined by the claims.

The invention claimed is:

1. A compactor for the of plastic materials, said compactor comprising:
    a first zone or unit for loading and distribution of said plastic material to a second zone or unit;
    a second zone or unit including a rotating spinneret having perforations and at least one compacting roller adjustably positioned outside said spinneret and configured for trapping the plastic material between each compacting roller and the spinneret for forcing the plastic material through said perforations in said spinneret within a predetermined controlled pressure range, as determined by a friction between each compacting roller and the spinneret, under the action of said at least one adjustably positioned compacting roller and at a controlled temperature with a predetermined range provided by a cooling circuit having a cooling fluid and being configured to cool the at least one compacting roller to allow the plastic material to be granulated by sinterization as result of the applied pressure and temperature;
    a third zone or unit downstream of said first zone or unit and arranged to drive and guide said plastic material onto said at least one compacting roller, the third zone or unit comprising at least one sorting conduit that receives the plastic material from the first zone or unit and at least one rotating auger housed at least partially in a corresponding at least one tubular housing, both the at least one rotating auger and the at least one tubular housing being located external to the at least one sorting conduit, the at least one auger and corresponding tubular housing being positioned radially about an exterior circumference of the spinneret to receive the plastic material from the at least one sorting conduit and to expel the plastic material from the tubular housing onto the at least one adjustably positioned compacting roller; and
    wherein the at least one compacting roller is positioned adjacent to and rotates in response to rotation of the spinneret for pressing the plastic material, expelled from the at least one tubular housing, between the at least one adjustably positioned compacting roller and the spinneret at a pressure within the predetermined range for extruding the plastic material through the spinneret perforations at a temperature within the predetermined range, and into a central chamber of the spinneret.

2. The compactor according to claim 1, wherein said at least one adjustably positioned roller is made to rotate by said spinneret.

3. The compactor according to claim 1, wherein the spinneret is cylindrical in shape having an inner and outer surface, and wherein the perforations of said spinneret are substantially conical in shape narrowing from the outer surface of said spinneret toward the inner surface of said spinneret.

4. The compactor according to claim 1, wherein said second zone or unit includes at cutter positioned at least partially inside said spinneret proximate the perforations of said spinneret and situated to cut extruded plastic material emerging through said perforations into granules of predefined length.

5. The compactor according to claim 1, wherein the at least one compacting roller includes a plurality of longitudinal grooves configured receive the plastic material that is discharged from the at least one auger and tubular housing.

6. The compactor according to claim 1, wherein the at least one auger and at least one compacting roller include six augers and six compacting rollers positioned external to the spinneret at radial intervals of 60°.

7. The compactor according to claim 1, wherein the cooling circuit is configured to provide the cooling fluid to the at least one compacting roller so as to maintain the at least one compacting roller at an operating temperature in the range of from 25° C. to 30° C.

8. The compactor according to claim 1, which further comprises a plurality of thermostatic temperature control units including infrared radiation sensors configured to maintain the predetermined operating temperature ranges of the at least one compacting roller and the spinneret.

9. The compactor according to claim 1, wherein the at least one compacting roller includes internal cooling ducts in fluid communication with a pressurized source of the cooling fluid.

10. The compactor according to claim 1, further comprising a fourth zone or unit positioned downstream of, and configured to collected granulated plastic material exiting said spinneret.

11. The compactor according to claim 10, wherein the fourth zone or unit comprises a hopper for collection of the granulated plastic material exiting said spinneret and means of delivery for delivery of the granulate into a container.

12. The compactor according to claim 1, wherein said at least one compacting roller comprises a tubular portion fitted so as to rotate on a load-bearing cylindrical fixed shaft, and said cooling circuit comprises at least one longitudinal cooling conduit that is formed inside of said cylindrical fixed shaft and extends along a length of the cylindrical fixed shaft.

13. The compactor according to claim 12, wherein said at least one longitudinal cooling conduit is dimensioned and configured to distribute said cooling fluid in a cavity formed between said tubular portion and the load-bearing fixed cylindrical shaft of the said at least one compacting roller.

14. The compactor according to claim 1, wherein the spinneret is coupled to a cooling/heating circuit positioned in the second zone that supplies a fluid that is hotter or colder than the spinneret so as to cool or heat said spinneret by contact with the fluid.

15. The compactor according to claim 14, wherein the cooling/heating circuit is configured to supply fluid heated or cooled such that the predetermined temperature of the spinneret remains within a range of 80° C. to 115° C.

16. The compactor according to claim 1 in which the spinneret includes ducts in fluid communication with a source of a temperature-controlled heat transfer fluid for maintaining the operating temperature of the spinneret within the predetermined range.

17. The method according to claim 16, wherein the heat transfer fluid is at a predetermined temperature that is greater than the temperature of the spinneret at the beginning of an operating cycle of the compactor in order to achieve a predetermined efficient operating temperature for granulation of the plastic material.

18. A compactor for granulation of plastic materials, said compactor comprising:
- a loading zone or unit for loading and distribution of said plastic material to a collection zone or unit, wherein the loading zone or unit includes a loading hopper and a conveyor belt for conveyance of the plastic material loaded at an end of said conveyor belt into said collection zone or unit, wherein the collection zone includes a plurality of sorting hoppers arranged side-by-side and a plurality of corresponding conduits that are separate from the sorting hoppers, wherein each conduit is attached at a first end to one respective sorting hopper and extends downwardly therefrom to allow the plastic material to travel by gravity within the respective conduit;
- a supplier station that includes a plurality of rotating augers that are housed at least partially in corresponding tubular housings, wherein second ends of the plurality of conduits are attached to a plurality of couplers that in turn are coupled to the plurality of rotating augers to allow the plastic material to travel within the plurality of conduits by gravity through the plurality of couplers to the plurality of augers, wherein the plurality of augers are located outside of the plurality of conduits; and
- a granulation zone or unit including a rotating spinneret having perforations and a plurality of compacting rollers adjustably positioned outside said spinneret and spaced circumferentially about said spinneret, wherein the plurality of augers and the corresponding tubular housings are positioned radially about an exterior circumference of the spinneret and interposed between the plurality of the compacting rollers to expel the plastic material from the tubular housings onto the plurality of adjustably positioned compacting rollers at different locations about the exterior circumference of the spinneret;
- wherein the plurality of compacting rollers are positioned adjacent to and rotate in response to rotation of the spinneret, such that the plastic material expelled from the tubular housings is trapped between each compacting roller and the spinneret and is pressed between the adjustably positioned compacting rollers and the spinneret, and is extruded through the spinneret into the central chamber of the spinneret.

19. The compactor according to claim 18, wherein each coupler is T-shaped and the corresponding conduit and corresponding auger that are attached to the coupler are oriented at 90 degrees with respect to one another.

20. The compactor according to claim 18, wherein each compacting roller comprises a tubular portion fitted so as to rotate on a load-bearing cylindrical fixed shaft, and said cooling circuit comprises a first longitudinal cooling conduit and a second longitudinal cooling conduit both of which are formed inside of said cylindrical fixed shaft and extend along a length of the cylindrical fixed shaft, the first longitudinal cooling conduit for delivering a cooling fluid to a cavity formed between said tubular portion and the load-bearing fixed cylindrical shaft of the said at least one compacting roller, the second longitudinal cooling circuit for collecting the cooling fluid from the cavity.

* * * * *